United States Patent [19]
Willis

[11] Patent Number: 5,982,453
[45] Date of Patent: Nov. 9, 1999

[54] REDUCTION OF VISIBILITY OF SPURIOUS SIGNALS IN VIDEO

[75] Inventor: Donald Henry Willis, Indianapolis, Ind.

[73] Assignee: Thomson Consumer Electronics, Inc., Indianapolis, Ind.

[21] Appl. No.: 08/719,926

[22] Filed: Sep. 25, 1996

[51] Int. Cl.$^6$ .................................................. H04N 5/911
[52] U.S. Cl. ...................... 348/607; 348/565; 348/567; 348/718
[58] Field of Search ...................... 348/607, 567, 348/565, 537, 470, 533, 535, 715, 716, 718, 719; 345/189, 190, 200, 213; H04N 5/907, 5/911

[56] References Cited

U.S. PATENT DOCUMENTS

| | | | |
|---|---|---|---|
| 4,638,360 | 1/1987 | Christopher et al. | 358/148 |
| 4,667,190 | 5/1987 | Fant | 340/747 |
| 4,768,083 | 8/1988 | Romesburg | 358/22 |
| 4,823,302 | 4/1989 | Chrictopher | 364/900 |
| 4,890,162 | 12/1989 | McNeely et al. | 358/138 |
| 4,951,126 | 8/1990 | Ohta | 358/22 |
| 4,987,491 | 1/1991 | Kaite et al. | 358/166 |
| 5,111,297 | 5/1992 | Tsuji et al. | 358/183 |
| 5,202,765 | 4/1993 | Lineberry | 358/183 |
| 5,206,768 | 4/1993 | Fukada | 360/36.2 |
| 5,208,660 | 5/1993 | Yoshida | 358/22 |
| 5,251,015 | 10/1993 | Rumreich | 358/20 |
| 5,329,366 | 7/1994 | Kuroda | 348/572 |
| 5,467,144 | 11/1995 | Saeger et al. | 348/566 |
| 5,528,308 | 6/1996 | Owada et al. | 348/497 |
| 5,541,665 | 7/1996 | Urata et al. | 348/571 |
| 5,631,713 | 5/1997 | Hoshino | 348/716 |
| 5,729,296 | 3/1998 | Rhodes | 348/441 |
| 5,754,247 | 5/1998 | Tauchi | 348/459 |

OTHER PUBLICATIONS

Rumreich, Mark, "Pix–in–Pix IC With Digital decoding/Encoding Using Only One Clock", IEEE Transactions on Consumer Electronics, vol. 37, No. 3, pp. 210–212, (Aug. 1991).

*Primary Examiner*—Michael H. Lee
*Assistant Examiner*—Jean W. Désir
*Attorney, Agent, or Firm*—Woodard, Emhardt, Naughton Moriarty & McNett

[57] ABSTRACT

A system and method for altering the appearance of interference in a video signal caused by spurious interference generated by repeated high speed digital memory write operations affecting video processing in analog circuitry in thereceiver. In one particular embodiment, a picture-in-picture television receiver is provided wherein both the main and sub-pictures are processed on a single IC including analog processing circuitry, as well as a small picture memory array to which small picture video samples are repeatedly being written. The visibility of spurious interference in the picture is reduced by periodically altering the clock timing during the repetitive high speed writing operation to redistribute the interference so as to be less noticeable to the television viewer.

8 Claims, 2 Drawing Sheets

REDUCTION OF VISIBILITY OF SPURIOUS SIGNALS IN VIDEO

FIELD OF THE INVENTION

The present invention relates generally to the field of reducing visibility of spurious interference in a video signal, and more specifically to reduce the visibility of interference in a video signal resulting from spurious interference in video processed in analog circuitry during repetitive high speed digital memory write operations.

BACKGROUND OF THE INVENTION

Television receivers which feature picture-in-picture processing are known. In such receivers an inset or "small" picture to be displayed within an area of a "main" or "large" picture is subjected to vertical and horizontal compression by means of selective storage and retrieval from a memory and the compressed picture video signal is inserted within an area of the main picture video signal by means of a multiplex switch that is controlled by timing signals provided by the picture in picture compression processor. Examples of picture-in-picture compression processors are described, for example, by D. L. McNeely and R. T. Fling in U.S. Pat. No. 4,890,162 and by E. D. Romesburg in U.S. Pat. No. 4,768,083, those patents incorporated herein by reference.

It has been suggested in the article "PIX-IN-PIX DIGITAL DECODING/ENCODING USING ONLY ONE CLOCK," Rumreich, IEEE Transactions on Consumer Electronics, Vol. 37, No. 3, August 1991, pp. 210–212 to create a single integrated circuit (IC) to receive two composite video inputs and to provide an overlaid composite video output. In that article, it is described that all video decoding and encoding is performed in an IC using digital signal processing and a single clock. In the above-named article to Rumreich, the small picture Y/R-Y/B-Y data is multiplexed and stored in an 8K×8 SRAM located external to the IC.

An IC has been developed which includes a line comb filter for the main picture, as well as video processing circuitry for the small or sub-picture, and including a small-picture field memory on chip shares the IC with all the other active circuitry. A single clock is used by all circuitry on the IC. Some of the circuitry on the IC is analog, i.e. analog-to-digital converters, digital-to-analog converters, video switches and buffers. In the processing of a video signal to become a small picture, the signal is decoded, anti-alias lowpass filtered, subsampled and written into a small-picture field memory. The memory writing operation is a relatively high-powered operation and can generate spurious interference with other circuits on the chip. This may result in interference which appears as obvious vertical stripes in the large picture, which is processed through the line comb filter circuit of the IC. This interference also is present in the small picture by being coupled into the small picture digital-to-analog converter, again producing vertical stripes.

Additionally, although this spurious interference has been found to occur in a picture-in-picture type system, it is not limited to such a system. It is believed that the occurrence of such a vertical stripe interference pattern may occur in any video signal processed using analog circuitry (i.e. a D/A converter, etc.) to process video during repetitive high speed digital memory write operations.

What is needed is a means for reducing the interference visibility caused by spurious interference throughout the analog circuitry during repetitive memory write operations.

SUMMARY OF THE INVENTION

A system and method is provided to reduce interference visibility in the video of a system wherein video is processed, in part by analog circuitry, at the same time as a repetitive, high speed digital memory write operation. In one particular embodiment of the present invention, interference visibility is reduced in the video by periodically altering the timing of the write operation.

According to one particular embodiment the present invention, the timing of the write operation to a memory array is periodically altered to reduce the visibility of an interference pattern in a picture-in-picture display. Further, in a particular embodiment, interference visibility is reduced in a television receiver including an integrated circuit having, among other circuitry, analog A/D and D/A converters used on the main picture video and a small-picture memory writing circuit, both sharing the same clock.

Other objects and advantages of the present invention will become more apparent from the following description of the preferred embodiment.

BRIEF DESCRIPTION OF THE DRAWINGS

The invention is illustrated in the accompanying drawing wherein like elements are denoted by like reference designators and in which.

DESCRIPTION OF THE PREFERRED EMBODIMENTS

Figure 1:
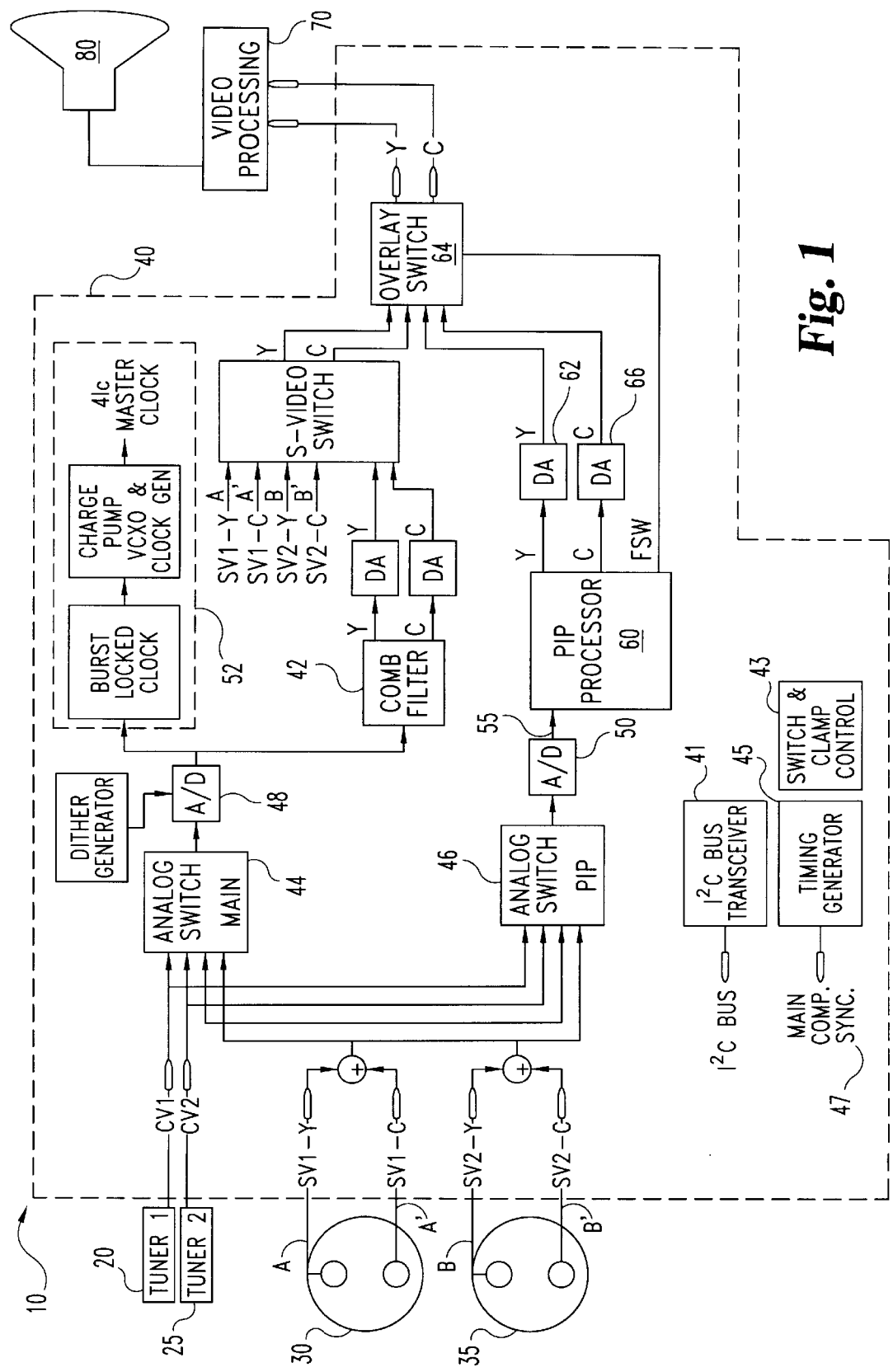
FIG. 1 is a block diagram of a television system incorporating an integrated circuit for processing video in a picture-in-picture system in accordance with one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and modifications in the illustrated device, and such further applications of the principles of the invention as illustrated therein being contemplated as would normally occur to one skilled in the art to which the invention relates.

The present invention provides a system and method for reducing the visibility of interference patterns in the video caused by spurious interference in a circuit used to process video using analog circuitry, as well as including circuitry for conducting a repetitive, high speed memory writing operation. Although, the present invention which can reduce the visibility of interference is described herebelow in connection with a picture-in-picture display, this is not meant to be limiting. The present invention will reduce the visibility of noise in a video signal whenever spurious interference is generated and affects the analog circuitry due to repetitive high speed digital memory writing operations, regardless of the type of video application.

Referring now to FIG. 1 there is shown a television receiver 10 including a picture-in-picture overlay system in accordance with a preferred embodiment of the present invention. The television receiver 10 of FIG. 1 includes tuning circuits 20 and 25 for providing first and second composite video signals for the television receiver 10. Additionally, two S-Video jacks SV1 30 and SV2 35, are provided for receiving an input from an external source, such as a video tape recorder or the like. The integrated circuit (IC) 40 of the present particular embodiment may provide, among other things, a digital line comb filter for the main picture, as well as all processing for the sub-picture (PIP). A single clock is used to drive all circuitry on IC 40. Luma and Chroma from the IC 40 go to video processor 70 for further processing, and is then provided to the CRT 80.

In the preferred embodiment, the integrated circuit 40 is a CMOS IC designed to process the single moving picture-in-picture function of the television receiver 10. The integrated circuit 40 includes, among other things, a digital comb filter 42 for the main picture Y/C separation, analog switches 44, 46 and 64 to perform the selection of the main and small pictures, swap and overlay functions, A/D converters 48 and 50, crystal clock 52, and the digital circuits necessary to process the small overlay picture.

The IC 40 is divided into several sections, the PIP processor 60, clock, comb, analog and bus sections. The PIP processor 60 section includes the decode, encode and field RAM subsections. The decode subsection takes a composite video waveform and decodes it to Y, R-Y and B-Y for storage into the internal field memory. The encode subsection, which takes the information stored in the internal field memory and encodes chroma and outputs separate Y/C small picture for over-laying on the main composite video signal. The Burst locked clock section 52 generates the clock for the system which is locked to the color subcarrier of the main composite video signal. The analog portions convert between the analog and digital domain and perform the video switching functions. The bus section 41 controls the IC functionality and communicates with the television receiver microprocessor, (not shown). Registers for holding the control information are distributed throughout the IC. Switch and clamp control 43 controls, among other things, the state of the switches 44 and 46.

The composite video signals (CV1 and CV2) and the two S-Video signals (SV1 and SV2) are provided to the IC. One will become the main picture and usually another will be the small picture, although the same source can be used for both the main and sub-pictures. These signals must be capacitively coupled to the IC for the analog sync tip clamps to operate. The signal selected for the small picture is sent to an A/D which samples it for digital signal processing. The signal selected for the main picture is sent from the A/D converter to two places:

1) to generate the burst locked clock and perform ACC for the small picture; and
2) to a Digital Comb Filter that provides one set of luminance (y) and chrominance (C) inputs to the internal overlay switch 64.

Luminance and chrominance inputs for the small picture (PIP) are provided to the overlay switch 64 from the PIP processor via D/As 62 and 66. A control signal FSW additionally originating from the PIP processor 60 provides control to the overlay switch 64. The outputs of the overlay switch 64 are luminance and chrominance signals having the small picture included.

The D/A's have a current output. The reference for the current is provided internal to the IC 40. The reference current for the chroma D/A varies with the amplitude of main video burst so that the chroma output will track the main video's chroma level. The luma D/A's reference is controllable via the bus.

As stated above, it has been found that when processing both the main and small video signals on a single integrated circuit due to the high-powered memory writing operation, spurious interference with other circuits on the chip may result. If left alone, this interference will appear as obvious vertical stripes in the main and sub-picture signals.

Figure 2:
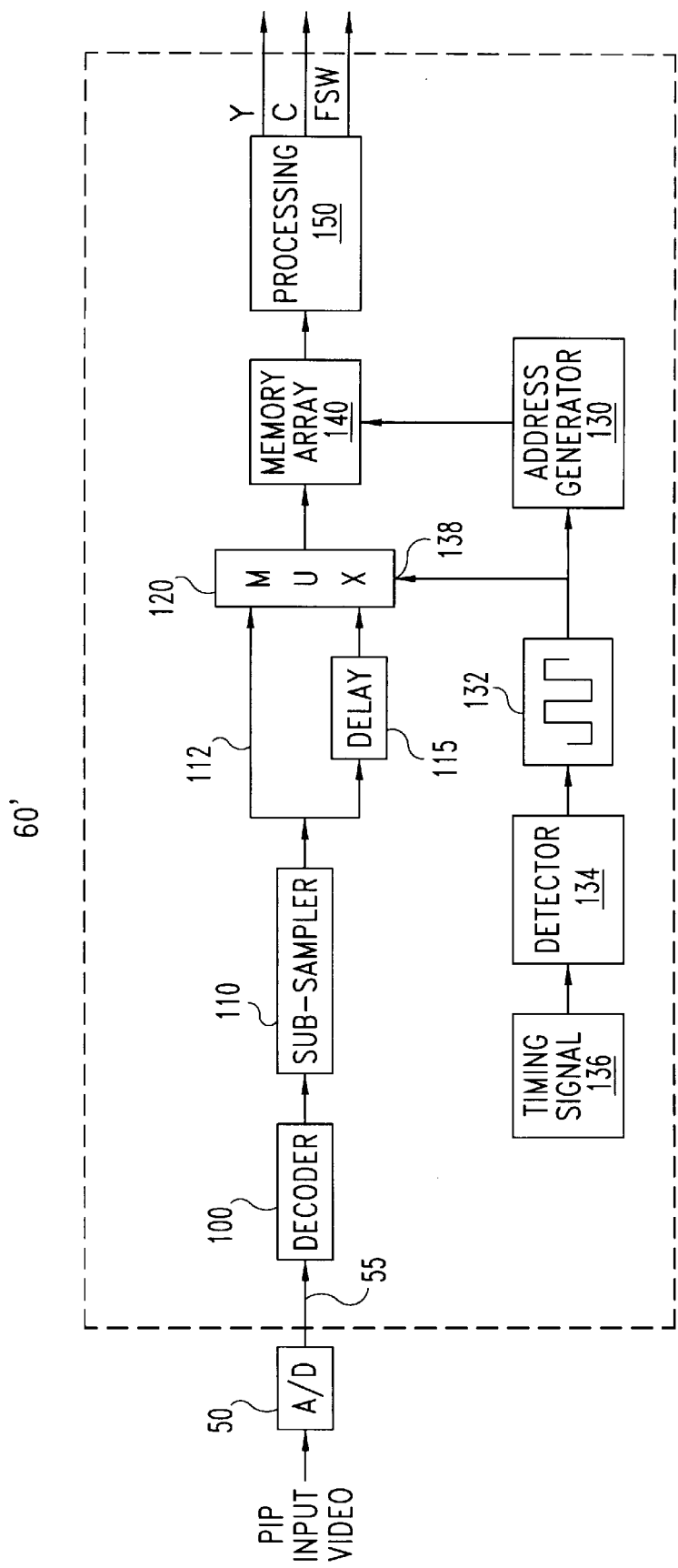
FIG. 2 is a block diagram of the picture-in-picture processing circuit useful with the integrated circuit of FIG. 1 and in accordance with the present invention.

Referring now to FIG. 2, there is shown a block diagram of a PIP processor circuit 60', such as may be used as the PIP processor 60 of FIG. 1. The PIP processor 60' includes circuitry which may periodically modify the write timing to a memory array in order to reduce the visibility of spurious interference generated in the IC 40. As shown in FIG. 2, PIP input video is supplied to the A/D converter 50, which provides digital signal outputs to the decoder 100. In decoder 100 the input video signal is decoded and anti-alias lowpass filtered, after which it is subsampled in subsampler 110. Note that any known method of decoding, filtering and subsampling the PIP video may be used. Examples of sub-sampling methods and devices are disclosed U.S. Pat. Nos. 4,890,162 to McNeely or U.S. Pat. No. 4,768,083 to Romesburg, both patents previously incorporated herein by reference, or alternatively, the sampling and display method disclosed in the co-pending provisional patent application entitled "SAMPLING AND DISPLAY METHOD FOR PICTURE-IN-PICTURE SYSTEM", which provisional application was filed with the Patent and Trademark Office on Sep. 6, 1996, on behalf of the present Applicant, Donald H. Willis, and the co-inventors of the invention disclosed therein, Steven W. Patton and Mark F. Rumreich, Ser. No. 60/025,532 that provisional application being additionally incorporated herein by reference in its entirely.

In accordance with the preferred embodiment of the present invention, the sub-sampled PIP video is written into a small picture field memory array 140. Memory 140 may be any known kind of memory array, i.e. an asynchronous memory, such as an SRAM or a synchronous memory, such as an SDRAM. In one particular embodiment of the present invention, the memory array 140 is implemented using an 8K×8 SRAM which conducts a write operation upon the coincidence of both address information from address generator 130 and video information from MUX 120 being provided thereto.

It has been found that there is some degree of flexibility in the exact memory writing timing that can be used. As such, in order to redistribute the interference to create a less noticeable interference pattern, in accordance with the present invention, the clock phase for writing the sub-sampled video lines into the PIP memory array 140 is modulated. As such, when the phase is modulated as described herein, the interference pattern visible in the picture is changed. This modulation can be performed in the video at various rates, for example, half of the line frequency rate, resulting in the clock phase for memory writing being shifted once per line if triggered one direction by the up and the other by the down transition of the square wave clock pulse. Additionally, the timing may be modulated with less frequency, for example, once every two frames. However, if modulated too infrequently, at some point the modulation will appear to the eye of the viewer as an annoying flicker in the picture. Preferably, the modulation will be at a half of the line frequency, or alternatively, at half of the field frequency (thus changing clock phase once per field).

In certain embodiments, the amount of clock phase shift per modulation may be chosen to be a divisible integer of 360 degrees. One desired clock phase change would be half of a sampling period. In one particularly preferred embodiment the phase change would be 180 degrees. Similarly, a clock phase change of ⅓ of a subsampling period can be used, resulting in a phase change of 120 degrees. However, if the phase change is too small, either objectionable patterns may appear, motion may be detected or flicker may appear in the video.

As an alternative to discrete phase changes, the frequency of the clock for the digital write operation may be selected and maintained such that visible interference is minimized. Such selection would require that there be no low integer or low integer ratio harmonic relationship between the write operation and either the horizontal or vertical television scan rates. In one preferred embodiment the scan rates are standard NTSC scan rates and the digital memory write operation clock rate is 2.386 MHz.

By changing the phase 180 degrees at half the line frequency, or at half the field frequency a line-quincunx or field-quincunx interference pattern, respectively, will be produced. It has been found that the quincunx pattern of interference is much less noticeable to the viewer than the vertical stripes. Additionally, it can be seen from the explanation herein that choosing different amounts of phase change and/or different frequencies of change can result in other manners of interference pattern.

Referring back to FIG. 2, in accordance with one particular embodiment of the present invention, a timing signal 136 provides a stream of timing pulses to the detector 134, each pulse indicative of the start of a new line or field, depending on whether modulation based on line frequency or field frequency, respectively, is chosen. The timing signal 136 may be produced by stripping the sync and using the stripped horizontal or vertical sync pulses to indicate the line or field start, respectively. Preferably, the sync signal from the main video signal (47 of FIG. 1) would be used. However, the sync signal from the small video signal may be stripped by the decoder 100 and used.

Detector 134 detects the timing signal pulses and provides a signal to produce a square wave from the square wave generator 132. The square wave produced by square wave generator 132 is supplied to the MUX control input 138. In one particular embodiment, detector 134 includes an edge detector and the square wave generator 132 includes a two-state flip flop circuit which changes state in response to a signal from the edge detector. The edge detector may be any kind of known edge detection circuitry to accomplish the desired result, and, in one particular embodiment, is a falling edge detector, which detects the falling edge of the line or field start pulse. If a half field frequency modulation is chosen, square wave generator 132 will output a two field period square wave. Likewise, if a half-line frequency modulation is chosen, square wave generator 132 will output a two line period square wave.

The square wave output produced by square wave generator 132 and detector 134 results in the periodic modification of the clock phase used for writing to the memory array 140. In the preferred embodiment illustrated in FIG. 2, the state of the square wave input to MUX control input 138 is used to select the input to the MUX 120 from either an undelayed input 112 or a delayed input 115. As the state of the square wave changes the MUX toggled between inputs 112 and 115, thus alternating between a clock phase shifted write cycle and the unshifted write cycle. The delay 115 is chosen so as to modify the clock phase a desired amount for writing the subsampled video to the memory array 140. The delay is dependent on the particular parameters of the system, as implemented. In one particular embodiment, using a clock phase change of ⅓ of a subsampling period, a two clock pulse delay is used to shift the writing phase 120 degrees. By providing a half line frequency square wave to the MUX control input 138, writing operations having the clock phase shifted forward by 120 degrees for one line and back 120 degrees for the next line are performed.

In a most preferred embodiment, the clock phase would be shifted 180 degrees once per line or once per field, depending on the modulation timing chosen. This has the effect of breaking up the vertical strip noise pattern into a less noticeable quincunx noise pattern in video.

If the memory array 120 is chosen to be an asynchronous SRAM which conducts a write operation when provided simultaneously with write address information from address generator 130 and video information from MUX 120, then the phase of the clock providing the write address information to the memory array 140 should be shifted in like fashion. As such, in the embodiment illustrated in FIG. 2, the square wave generated by the square wave generator 132 is additionally provided to the address generator 130. When the state of the square wave is such that the MUX 140 selects the delayed input 115, the address generator will, likewise, incorporate a corresponding timing delay.

Samples output from the memory array 140 are further processed in processing block 150. In one particular embodiment, a demux takes data from the memory array and reassembles the chroma samples, while buffering the luma samples so that they remain time aligned with the chroma samples. The method chosen for reassembling the sub-sampled pixels may be any type of known method and should be chosen to complement the method used to perform the sub-sampling.

The processing block 150 may additionally process the PIP luma data to provide skew correction retiming the output samples for the small picture in a manner so as to prevent line jitter of the small picture when overlaid onto the main picture, such as the manner described in the article "PIX-IN-PIX DIGITAL DECODING/ ENCODING USING ONLY ONE CLOCK," Rumreich, IEEE Transactions on Consumer Electronics, Vol. 37, No. 3, August 1991, pp. 210–212, that article incorporated by reference herein. Additionally in the processing block 150, demultiplexed PIP chroma may be remodulated and further adjustments may be made, for example for coarse tint adjustment. Additionally, the processing block 150 generates a control signal FSW for controlling the overlay switch (64 of FIG. 1).

Referring back to FIG. 1, the skew corrected PIP luma and the PIP chroma are provided from the PIP processor 60 to D/A converters 62 and 66, respectively. The main picture luma and chroma as well as the PIP luma and chroma are provided to the overlay switch 64, where the overlaying of the video is controlled by the PIP processor circuit 60, using the control signal FSW. The overlaid video is further processed in video processor 70 and a final video signal is relayed to the Display or CRT 80. By processing the video as described herein, the vertical stripe noise pattern will be broken up and redistributed throughout the video in a less noticeable manner.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. For example, the invention described herein in connection with a television receiver may be incorporated into the circuitry of a VCR or other type of television product.

What is claimed is:

1. A television product with reduced visibility of spurious interference in the output video signal, comprising:

a display for displaying an output video signal;

at least one video input for receiving at least one input video signal;

a fast memory for storing video picture information;

an integrated circuit for processing the at least one input video signal, said integrated circuit including, analog circuitry for processing the video signal, a high speed writing circuit for repetitively writing video picture information to said fast memory, a clock for producing a clock timing signal, a write timing modifier connected to said clock to receive said clock timing signal from said clock, said write timing modifier including circuitry to periodically alter said clock timing signal at least once per every two frames of the output video, and for providing said altered clock timing signal to said high speed writing circuit, whereby said periodically altered clock timing signal causes a periodic shift in said writing to said fast memory thus producing an altered interference pattern in the output video signal, wherein, said write timing modifier periodically delays said clock timing signal whereby changing the phase of said clock timing signal, and wherein said write timing modifier includes a second timing signal and a detector for detecting said second timing signal, and wherein said detector additionally generates square waves in response to said timing signal.

2. The television product of claim 1 wherein said second timing signal comprises one of a sequence of line start pulses and field start pulses and wherein said write timing modifier alters said clock timing signal one of once per line and once per field.

3. The television product of claim 2 wherein said second timing signal is comprised of line start pulses and said square wave is a two line period square wave and wherein said write timing modifier alters said clock timing signal once per line in response to said square wave.

4. The television product of claim 2 wherein said second timing signal is comprised of field start pulses and said square wave is a two field period square wave and wherein said write timing modifier alters said clock timing signal once per field in response to said square wave.

5. The television product of claim 3 wherein said clock timing signal is periodically delayed to change the phase of said clock timing signal 180 degrees once per line.

6. The television product of claim 3 wherein said clock timing signal is periodically delayed to change the phase of said clock timing signal 120 degrees once per line.

7. The television product of claim 4 wherein said clock timing signal is periodically delayed to change the phase of said clock timing signal 180 degrees once per field.

8. A television receiver, comprising:

a first input to provide a first video input signal to the receiver;

a second input to provide a second video input signal to the receiver, wherein said second video input signal may be the same as said first video input signal;

a main picture processing circuit;

a sub-picture processing circuit;

a main picture video switch connected between said main picture processing circuit and said first and said second inputs for providing one of said first video input signal and said second input video signal to said main picture processing circuit;

a sub-picture video switch connected between said sub-picture processing circuit and said first and said second inputs for providing one of said first video input signal and said second input video signal to said sub-picture processing circuit;

at least one switch controller for controlling the state of said main picture video switch and said sub-picture video switch;

wherein said main video processing processes a main picture video signal provided to said main picture processing circuit and provides said processed video to an overlay switch;

wherein said sub-picture processing circuit, includes, a decoder for separating a sub-picture video signal into luma and chroma components, a sub-sampler to obtain samples of said components, a memory array for storing said samples, a multiplexer for providing said samples to said memory array, a write control in communication with said multiplexer for controlling the writing of said samples into said memory array, said write control providing a write timing signal to said multiplexer to enable said samples to be written to said memory array when said write timing signal is active, a write timing modifier to periodically alter the write timing signal to alter the timing with which said samples are written to said memory array, whereby altering the phase in which said samples are written into said memory array, a processing circuit for recovering and further processing said samples and providing a small video output signal to an overlay switch, and an overlay switch for receiving said processed main picture video and said small video output signal and for producing an overlaid video signal wherein said small video output is overlaid with said main picture video output.

\* \* \* \* \*